July 11, 1939.  R. F. BASS ET AL  2,165,211
AIRPORT BEACON
Filed Nov. 10, 1937   3 Sheets—Sheet 1
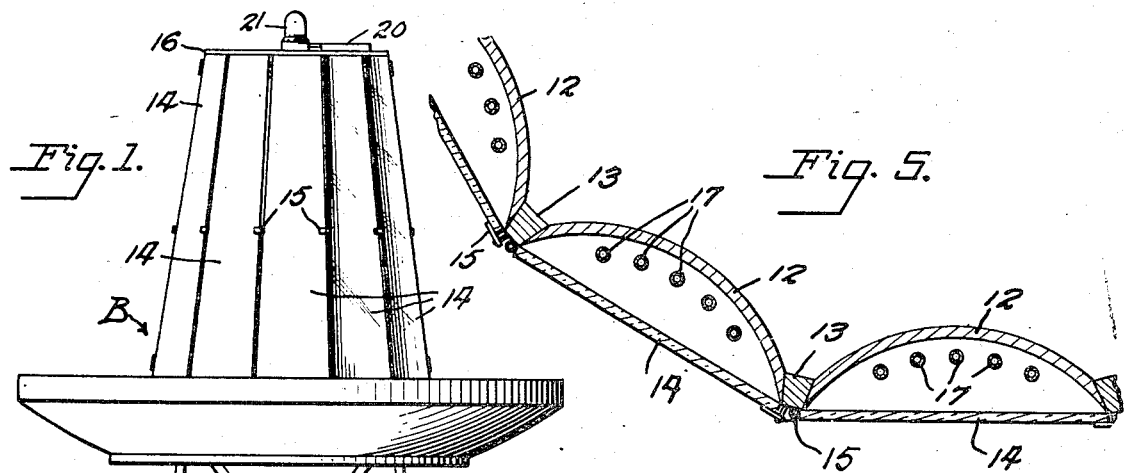
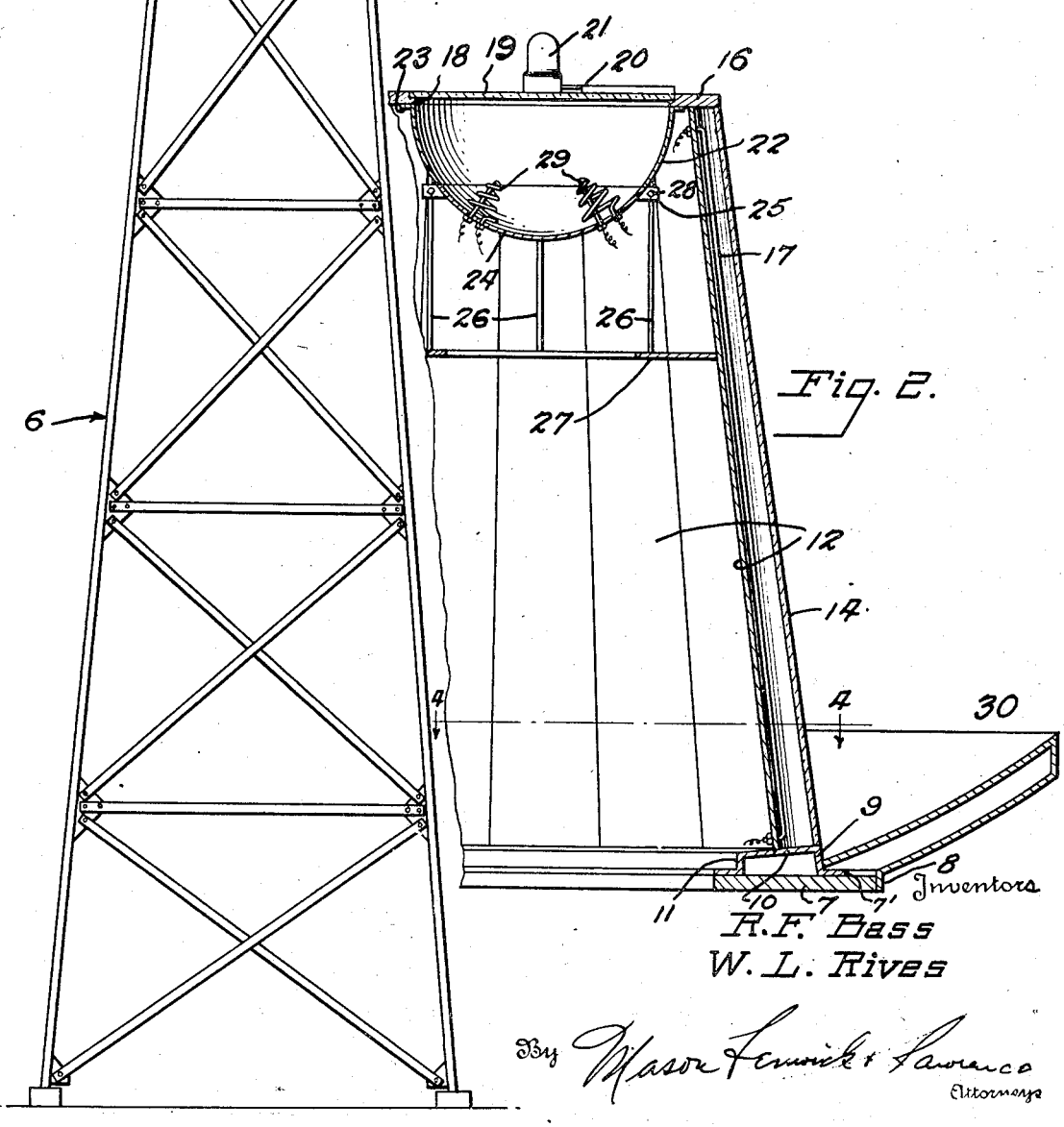
Inventors
R. F. Bass
W. L. Rives
By Mason Fenwick & Lawrence
Attorneys July 11, 1939.  R. F. BASS ET AL  2,165,211

AIRPORT BEACON

Filed Nov. 10, 1937  3 Sheets-Sheet 2

Inventors
R. F. Bass
W. L. Rives
By Mason Fenwick & Lawrence
Attorneys

July 11, 1939.  R. F. BASS ET AL  2,165,211
AIRPORT BEACON
Filed Nov. 10, 1937  3 Sheets-Sheet 3

Inventor
R. F. Bass
W. L. Rives
By Mason Fenwick & Lawrence
Attorneys

Patented July 11, 1939

2,165,211

UNITED STATES PATENT OFFICE 2,165,211

AIRPORT BEACON

Roland F. Bass and Walter L. Rives, Jacksonville, Fla., assignors to Airport Beacons, Inc., Jacksonville, Fla., a corporation of Florida Application November 10, 1937, Serial No. 173,892

4 Claims. (Cl. 240—1.2)

The invention forming the subject matter of this application is a light beacon adapted for sending out rays of light during the night or in foggy, overcast weather for the guidance of aerial and marine navigators.

According to the invention, this light beacon comprises an elevated framework or tower supporting a parabolic reflector combined with a source of light for the purpose of projecting parallel rays of light vertically upward. This horizontally arranged reflector forms a center member about which is grouped a series of relatively long concave reflectors combined with neon lights of the bar type for projecting light in all directions toward the horizon, and around the vertical beam.

It is the main object of the invention, therefore, to provide a light beacon which shall project intense rays of colored light both vertically upward and in all directions between the vertical and the horizontal so as to provide an effective beacon for the guidance of aviators during the night time, or at any other time when fog, mist or heavy weather render navigation difficult.

Other objects of the invention will become apparent as the detailed description thereof proceeds.

In the drawings:

Figure 1 is an elevation of a beacon constituting the present invention and mounted on a supporting tower;

Figure 2 is a fragmentary vertical section through the axis of the light beacon;

Figure 5 is a fragmentary plan, to an enlarged scale, illustrating certain details of construction;

Figure 3:
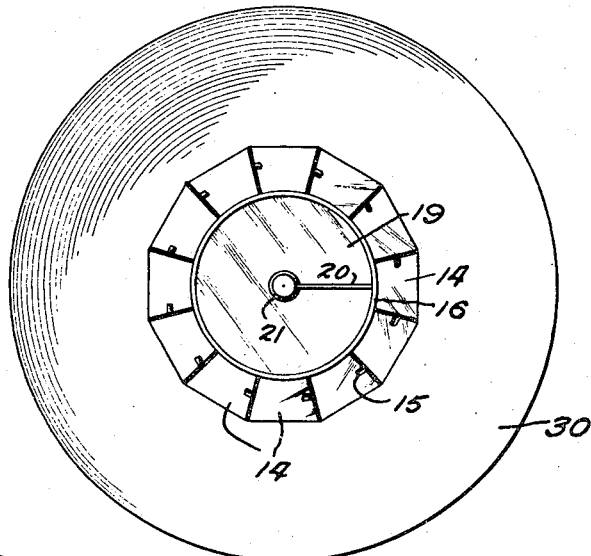
Figure 3 is a top plan view of the beacon.
Figure 4:
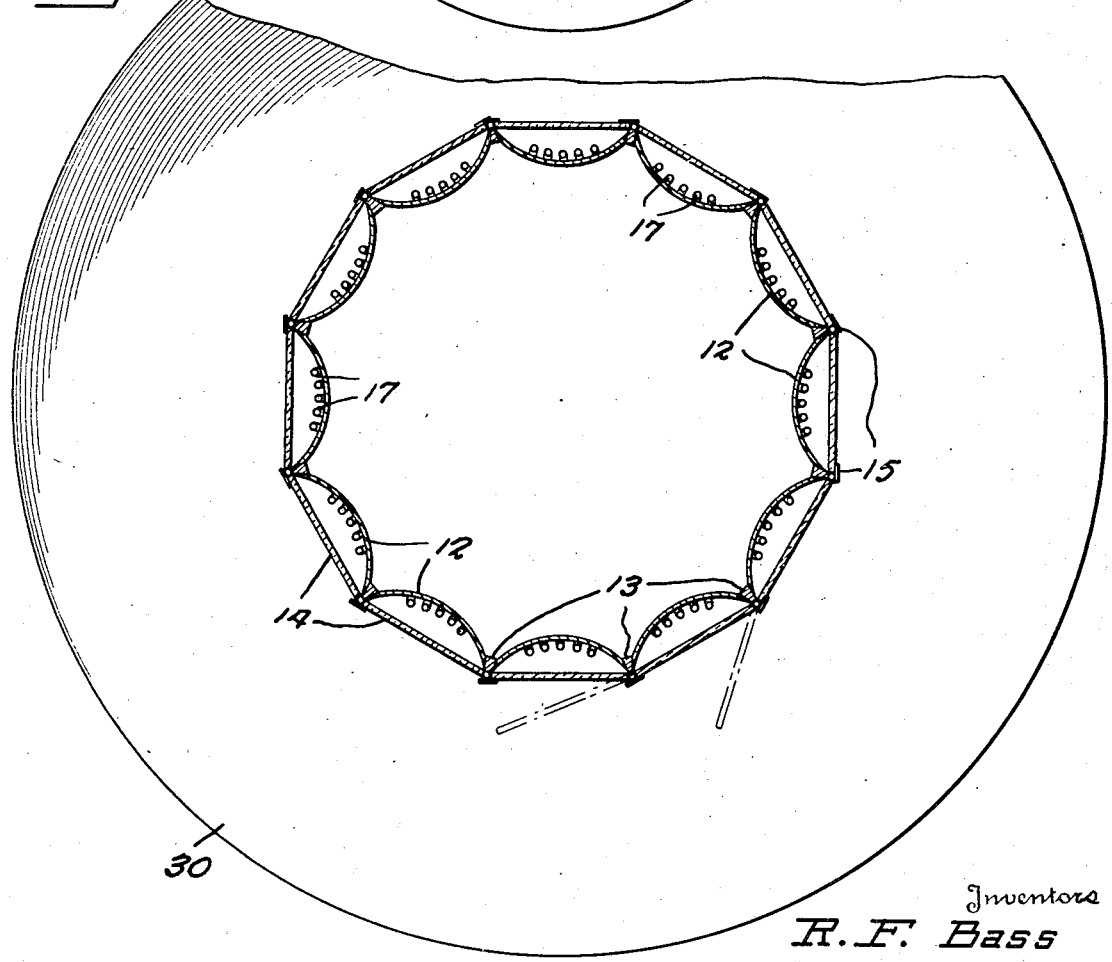
Figure 4 is a fragmentary horizontal section, to an enlarged scale, taken on the line 4—4 of Figure 2.

As shown in the drawings, the light beacon forming the subject matter of this application comprises skeleton framework forming a tower, designated generally by the reference numeral 6. The top of the tower has suitably secured thereto an annular base 7, upon which is mounted the several parts of the beacon proper which is designated in Figure 1 of the drawings by the reference character B.

The beacon proper comprises a base 7' having a flange 8 projecting downwardly and fitting snugly around the outer periphery of the base 7. The base 7' is suitably secured to the annular base 7 and is provided with a flange 9 extending upwardly and connected by a plate 10 to a downwardly directed flange 11 which rests upon the upper surface of the base 7.

The plate 10 is annular and is slightly inclined to the horizontal. Equiangularly spaced around the plate 10 is a series of concave reflectors 12 suitably secured to the angular bars 13 which constitute a supporting framework for the lighting mechanism of the beacon proper. The concave reflectors are perpendicular to the plate 10, and consequently are slightly inclined to the vertical, with their elements forming cones coaxial with the annular base 7.

Each reflector is closed by a glass door 14, hinged at one end to one of the angular bars 13, and secured in closed position by means of a thumb latch 15 suitably secured or mounted upon the angular bar 13 at the other edge of the same reflector. The flat glass doors 14 thus form a pyramid, or frustum of a pyramid, the top of which is formed by an annular plate 16 which is suitably secured to the upper ends of the angular bars 13.

Suitably supported on and extending lengthwise of each reflector 12 is a series of neon tubes 17 adapted to be connected electrically to any source of electricity in any of the well known manners. These tubes are standard tubes, and their connections in the usual electric circuit are so well known that it is deemed unnecessary to illustrate the same herein, since they form no part of the present invention.

Preferably, the neon tubes are designed to emit red rays of light. Consequently, at night time, or at any other time when visibility is poor, due to fog or mist or heavy weather, the beacon is more readily picked up than would be the case if white lights were used.

The annular plate 16 is provided with a circular opening 18, the edge of which is rabbeted to form a seat for a glass cover 19 which may be kept clear of ice and snow by means of a wiper 20, suitably connected for rotation by a motor 21 over the surface of the cover 19.

The upper part 22 of a parabolic reflector is secured by a flange 23 to the lower face of the annular plate 16. The lower part 24 of this parabolic reflector is secured to an annular support 25 which is mounted to slide vertically on rods 26 extending upwardly from a plate 27 which is suitably secured to the angular bars 13. The plate 27, in addition to supporting the rods 26 constitutes a brace for securing the angular bars 13 in position as part of the beacon skeleton framework. Any suitable means, such as set screws 28, may be used to support the lower part of the parabolic reflector in contact with its upper part. Preferably, four spiral tubes 29 are mounted in the lower part 24 of the parabolic reflector, and are suitably connected to a source of electrical energy by flexible cables.

An apron reflector 30 extends laterally outward from the base plate 7' for the purpose of directing upwardly any rays projected thereon by the tubes 17 and the reflectors 12.

The vertical beam at the top of the beacon is produced by induction by means of an induction lamp of very high intensity and acting on the principle of a searchlight. The light source is arranged at the focus of a parabolic reflector, and is practically everlasting because of the fact that it operates by induction and without the use of electrodes.

It is intended that any airport equipped with these beacon lights, will have them so placed as to indicate the directions of the runways. It is also intended that the height of the towers supporting the beacons will be standardized, so that a pilot approaching the airport may, by observing the horizontal plane of the beacon, know at what altitude he is flying; and further, by observing the direct line between any two bacons, determine the direction of the runways.

The neon lamps 17 are connected through transformers 31 to the supply mains 32 and 33; and an electromagnet 34 is interposed on one of said mains to hold the circuit through an alarm P broken so long as the transformers and lights are operating properly. When any break occurs in the secondary of any transformer, the electro magnet 34 becomes partially deenergized and the armature switch 35, controlled thereby, drops into contact with the fixed contact 36 to close the circuit through the alarm P which may be located wherever desired.

Figure 6:
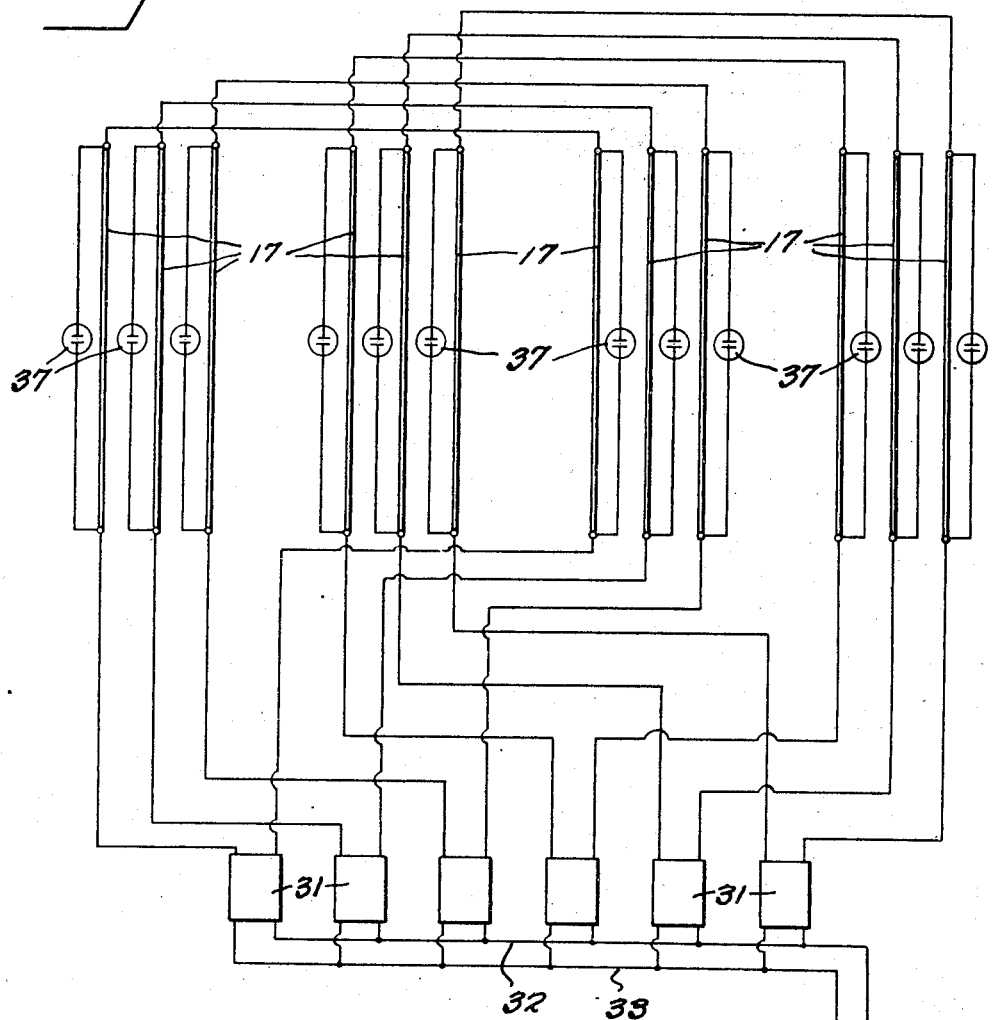
Figure 6 is a wiring diagram.
Figure 7:
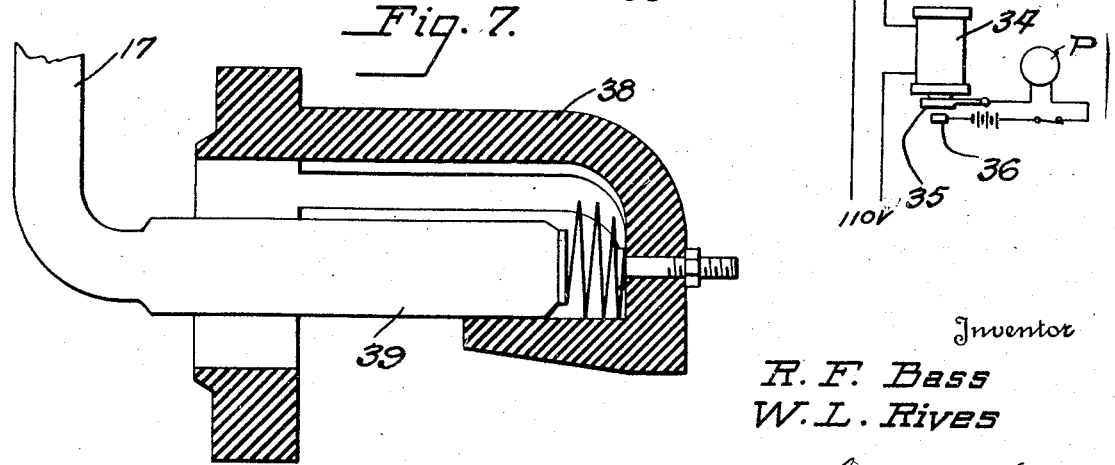
Figure 7 is a fragmentary cross section of an electrode housing forming part of the electric system.

As shown in Figure 6, the lamps 17 are arranged in groups of three, with two of the lamps in alternate groups connected in series through one of the transformers 31 to the supply mains. By this arrangement, complete failure in any group is avoided. As a further safeguard against electrical failure, a spark gap is arranged across the terminals of each tube to operate upon the failure of is connected tube and immediately energize the other tubes in the same circuit.

In order to avoid breakdown at the electrodes due to accumulation of moisture over the insulating bushing, a housing 38 is used to maintain an air gap around the electrode glass envelope 39 to prevent arc-overs from the electrode shell and the metal reflectors of opposite potential.

In accordance with the patent statues, I have described the principles and construction of my combined beacon and lantern, and while I have illustrated a particular formation, I desire to have it understood that the same is only illustrative of a means of carrying out my invention in one form, and that obvious changes may be made by anyone skilled in the art within the scope of the following claims without departing from the spirit of my invention.

What we claim is:

1. A light beacon comprising a substantially horizontal base; a plurality of elongated reflectors mounted on said base at a slight inclination to the vertical, said reflectors being concave in cross section and mounted with the elements of their reflecting surfaces in nested coaxial cones; neon tubes mounted on said reflectors; means at the upper ends of said tubes and coaxial therewith for projecting a beam of light vertically upward; and means extending laterally from said horizontal base for reflecting rays of light upwardly therefrom.

2. A light beacon comprising a circular substantially horizontal base; a plurality of elongated reflectors equiangularly spaced around said base and arranged at a slight inclination to the vertical axis of said base, said reflectors being concave in cross section with the elements of their reflecting surfaces lying in nested coaxial cones; neon tubes mounted on said reflectors; a parabolic reflector mounted at the upper ends of said tube and coaxial therewith; conical spiral neon tubes mounted on said parabolic reflector with their axes intersecting each other at the focus of the parabolic reflector; and an annular reflector extending horizontally from said base for projecting rays of light upwardly therefrom.

3. A light beacon comprising a substantially horizontal circular base; skeleton framework formed as a frustum of a regular pyramid on said base; a plurality of elongated reflectors having their adjacent edges secured to said framework, said reflectors being concave in cross section; neon tubes extending lengthwise of said chamber and mounted on said reflectors; a parabolic reflector mounted at the upper end of said framework coaxial with said elongated reflectors and said circular base; neon lamps mounted in said parabolic reflector to have their rays of light projected upwardly as a beam along the common axis of said base and reflectors, said parabolic reflector being formed in two sections connected by a substantially horizontal joint with the upper section fixed to said framework, and means for supporting the lower section for vertical movement toward and from the upper section.

4. A light beacon comprising a substantially horizontal circular base; skeleton framework formed as a frustum of a regular pyramid on said base; a plurality of elongated reflectors having their adjacent edges secured to said framework, said reflectors being concave in cross section; neon tubes extending lengthwise of said chamber and mounted on said reflectors; a parabolic reflector mounted at the uper end of said framework coaxial with said elongated reflectors and said circular base; neon lamps mounted in said parabolic reflector to have their rays of light projected upwardly as a beam along the common axis of said base and reflectors, said parabolic reflector being formed in two sections connected by a substantially horizontal joint with the upper section fixed to said framework, means for supporting the lower section for vertical movement toward and from the upper section; and means for securing said lower section in adjusted position.

ROLAND F. BASS.
WALTER L. RIVES.